March 31, 1936.  H. E. SIPE  2,035,674
FASTENING DEVICE
Filed Feb. 11, 1933
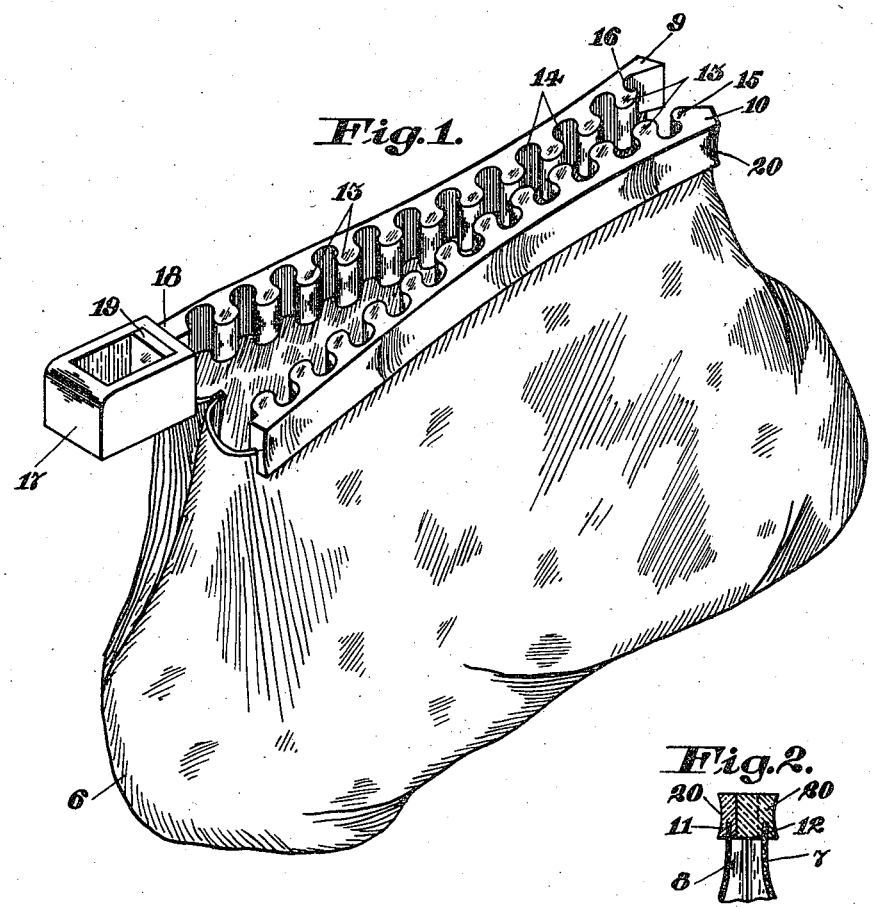
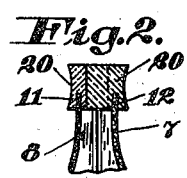
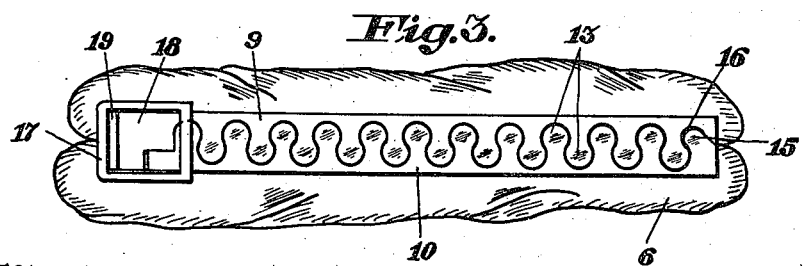
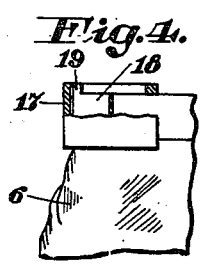
INVENTOR.
Harry E. Sipe
BY Kelley & Chisholm
ATTORNEY.

Patented Mar. 31, 1936

2,035,674

UNITED STATES PATENT OFFICE 2,035,674

FASTENING DEVICE

Harry E. Sipe, New York, N. Y., assignor to Hookless Fastener Company, a corporation of Pennsylvania Application February 11, 1933, Serial No. 656,279

8 Claims. (Cl. 24—204)

This invention relates to fastening devices suitable for closing the mouth of a bag or similar article although their use is not limited to such articles.

The principal object of the invention is to provide a fastening device which shall be particularly well adapted for hand bags or the like and which shall be pleasing in appearance, secure in engagement and easy to operate.

Other objects are to provide an improved fastener of this type which shall resemble in some respects an ornamental frame for a hand bag; to provide an improved quick operation fastener which can be easily attached to a bag.

In one form, my invention provides a semi-rigid fastener structure in the form of flexible strips having headed projections throughout their length, of a hard material which can be intermeshed to provide a secure interlock throughout the length of the strips. A "hard material" as used herein and in the appended claims is intended to mean a material which feels hard to the touch and is not capable of substantial flow under the pressure of the hands. For example a "hard material" would describe such materials as wood, celluloid, hard metals and hard rubber, as distinguished from soft rubber, textile fabrics, etc. Preferably, though not necessarily, the fastener is made from strips of a hard plastic material in any suitable color, such as celluloid, pyralin, Lumarith, bakelite compositions, hard rubber, or any of the whole range of plastics having similar properties. The strips are of generally rectangular cross section, and sufficiently flexible in a plane perpendicular to their width that they can be flexed by hand within the required limits.

In the accompanying drawing, I have shown for purposes of illustration, one embodiment which my invention may assume in practice. In the drawing:

Fig. 1 is a perspective view of a bag equipped with my improved fastening device;

Fig. 2 is a cross section through the fastening device;

Fig. 3 is a plan view of the fastener and bag;

Fig. 4 is a detailed view showing the fastener retaining means; and

Fig. 5 is a cross section through the fastener retaining device.

Although the fastening device is applicable generally to several classes of articles, a conventional type of hand bag is indicated in the drawing by the numeral 6. The bag preferably has outer walls 7, 8 which are trimmed off at the top to provide straight edges.

The fastening device comprises a pair of resilient strips 9, 10 of generally rectangular cross section, having slots 11, 12 along their narrow sides into which the walls 7, 8 may be secured in any suitable manner, such as by cement or glue, or if the strips are of celluloid, they may be stuck to the material of the bag by solvent and the use of pressure.

The strips are normally convexly curved relative to each other and have on their opposed convex faces rib-like headed projections 13 which are wider at their heads than at their base portions. Such projections preferably extend throughout the width of the strips so that the parts can be easily cut or molded to form, and to increase the flexibility of the strips in a lateral direction. The projections are so spaced and shaped as to provide groove-like recesses 14 between them and since the recesses are of corresponding size and shape, they will receive and hold the projections on the opposite strip engaged therewith. The shape of the projections is such that they can be brought into engagement and disengagement simply by the flexibility of the strips. It will be understood that in their normal curved positions the opening of the recess is wider than when the strips are bent into a straight line, so that the projections can pass into the recesses and be interlocked therewith simply by flexing of the strips. It is necessary, with the type of projections shown, to provide an initial connecting means and for this purpose a hook 15 is formed on one strip to engage in a corresponding recess 16 in the opposite strip.

When the fastening device is closed the strips are releasably held from coming apart by a suitable retaining device. For this purpose I have illustrated a small hollow slide 17 which is mounted on an extension 18 of the strip 9, and is prevented from coming off by a head 19 on such extension. When the strips are brought together, the slide 17 is pushed over the ends of both strips to hold them together.

In operation, the user will press the initial connecting device together and run the thumb and finger along the sides of the fastener to close it. The outer sides of the strips may be suitably grooved as indicated at 20 to form guides for the fingers. In disengaging the fastener, it is merely necessary to release the slide and the strips will spring open.

As a result of my invention, it will be seen that I have provided a novel fastening device for hand bags which combines the functions of a secure continuous fastening and an ornamental frame. If desired, additional hinged frame parts may be provided at the sides of the bag running up to the fastener strips, which in some cases, would make a more shapely and desirable bag. It is believed that a fastener of this character can be easily and cheaply manufactured and that it will be very strong in engagement due to the relatively rigid interlocking parts. When the two strips are assembled, they are relatively rigid but singly, they are sufficiently flexible for opening and closing the fastener.

While I have shown and described in this application, one embodiment which my invention may assume in practice, it will be understood that this embodiment is merely for the purposes of illustration and description, and that various other forms may be devised within the scope of my invention, as defined in the appended claims.

What I claim as my invention is:

1. A fastening device of the class described comprising two elongated strips of generally rectangular cross section, a row of projections integral with the strip extending across the width thereof and spaced apart along the length of said strips, recesses between said projections shaped to receive and hold projections on the opposite strip when engaged therewith, said strips being flexible in a plane perpendicular to the projections to permit progressive engagement and disengagement of the same, and relatively inflexible in a plane parallel to the wide faces of the strips.

2. A fastening device of the class described comprising two elongated strips composed of a hard material, normally convexly curved relative to each other, said strips as a whole having sufficient resiliency that they can be manually sprung into straight line positions parallel with each other, said strips having cooperating projections and recesses integral therewith on their normally convex faces and adapted to be interengaged progressively by bending said strips into said straight line positions in contact with each other throughout their length.

3. A fastening device of the class described comprising a pair of resilient elongated strips normally convexly curved relative to each other, having projections of a hard material, recesses between said projections of such size and shape as to permit the entrance or release of a projection on the opposite series when said strips are in their normal convexly curved relation, means for initially connecting said strips at one end whereby said projections and recesses may be progressively engaged by bending said strips toward each other, and means for holding said strips together when interlocked.

4. A fastening device of the class described comprising two elongated strips composed of a hard material normally convexly curved relative to each other, said strips as a whole having sufficient resiliency that they can be sprung into straight line positions parallel to each other, cooperating recesses and projections on opposed faces of said strips shaped to receive and hold the projections on the opposite strip, initial connecting means integral with said strips at one end, and means for releasably holding said strips together at the opposite end when interlocked, against the spring-like tendency of said strips to return to their normal convex position.

5. A fastening device of the class described comprising two elongated strips composed of a hard material, said strips having projections of the same material integral therewith and correspondingly shaped recesses between said projections whereby the projections on one strip may interlock with the recesses on the other strip, said strips having sufficient resiliency as a whole that they can be flexed relative to one another sufficiently to engage and disengage said projections and recesses, and separable initial connecting means at one end of said strips.

6. A fastening device as defined in claim 5 in combination with means for releasably holding said strips together at the end opposite the initial connecting means when the fastener is closed.

7. A fastening device of the class described comprising two elongated strips of generally rectangular cross-section and of a hard material, said strips having slots formed therein along the narrow sides thereof, headed projections extending across the wide sides of said strips, and recesses between said headed projections of corresponding shape to receive and hold the projections on the opposite strip when interengaged therewith.

8. A fastening device of the class described comprising two elongated strips of generally rectangular cross-section and of celluloid, said strips having rib-like projections extending transversely across the width of the strips, said projections having head portions wider than the base portions, and groove-like recesses between said projections of the same size and shape as said projections, said strips being flexible inwardly toward each other to engage progressively said projections and recesses and flexible outwardly from each other to disengage the same.

HARRY E. SIPE.